United States Patent [19]

Motta

[11] Patent Number: 5,193,959
[45] Date of Patent: Mar. 16, 1993

[54] METALLIC STAPLE PARTICULARLY FOR THE BUTT JOINING OF ELEMENTS MADE OF WOOD OR THE LIKE

[75] Inventor: Alfredo Motta, Preganziol, Italy

[73] Assignee: Brevetti M.A. S.r.l., Cecchini di Pasiano, Italy

[21] Appl. No.: 765,741

[22] Filed: Sep. 26, 1991

[30] Foreign Application Priority Data

Oct. 4, 1990 [IT] Italy ............................ 41706 A/90

[51] Int. Cl.⁵ .......................................... F16B 15/00
[52] U.S. Cl. .................................... 411/478; 411/920
[58] Field of Search ............... 411/478, 477, 920, 439, 411/461; 206/343, 344

[56] References Cited

U.S. PATENT DOCUMENTS

| | | | |
|---|---|---|---|
| 725,375 | 4/1903 | Stambach | 411/912 X |
| 2,080,962 | 5/1937 | Febrey | 411/478 |
| 3,431,810 | 3/1969 | Black | 411/478 |
| 3,507,384 | 4/1970 | Lippitt | 206/343 |
| 4,501,102 | 2/1985 | Knowles . | |
| 4,514,126 | 4/1985 | Knowles . | |
| 4,681,498 | 7/1987 | Raffoni | 411/478 X |
| 4,718,804 | 1/1988 | Cassese | 411/478 |

FOREIGN PATENT DOCUMENTS

| | | | |
|---|---|---|---|
| 2525949 | 11/1983 | France . | |
| 2629151 | 9/1989 | France | 411/477 |

Primary Examiner—Rodney M. Lindsey
Attorney, Agent, or Firm—Guido Modiano; Albert Josif

[57] ABSTRACT

The metallic staple particularly suitable for the butt joining of elements made of wood or the like, for example for manufacturing frames of paintings or other items, includes a rectangular lamina with longitudinal shapings and a transverse cutting edge. The shapings comprise a central V-shaped portion which is laterally blended with two wings which define respective inclined plane portions which diverge with respect to one another in the direction of insertion. The cutting edge has a two-sided taper.

13 Claims, 1 Drawing Sheet

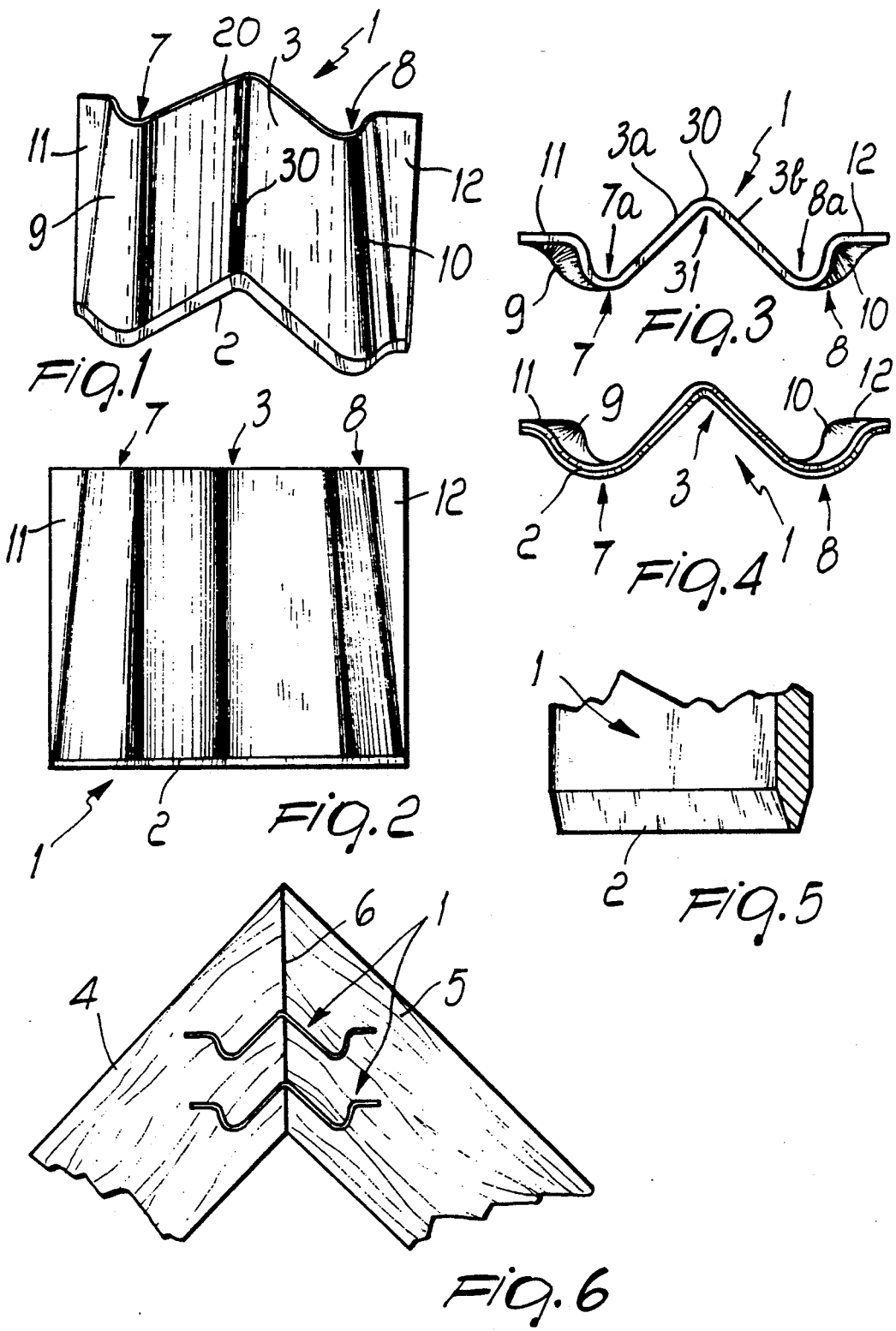

METALLIC STAPLE PARTICULARLY FOR THE BUTT JOINING OF ELEMENTS MADE OF WOOD OR THE LIKE

BACKGROUND OF THE INVENTION

The present invention relates to a metallic staple which can be used particularly but not exclusively to join continuous elements made of wood or the like for example to manufacture frames for paintings or the like.

For the joining of contiguous wood elements for the manufacture of frames, a system is currently used which consists in locking said elements in the required mutual position and in inserting therein, from the rear side, one or more shaped metallic staples.

The staples are inserted edgeways and penetrate in both elements simultaneously at their connecting line.

The staples currently in use are of various types, but those most commonly used are substantially related to three types of execution.

A first type has a central flat portion and two lateral corrugations which diverge with respect to one another in the direction of insertion.

This staple, which is provided with a cutting edge with a two-sided taper, produces an optimum traction between the wood strips, especially in hard and fibrous woods, but since the central part cuts the fibers of the wood obliquely and has a profile with a very small radius of curvature, deformations and accumulations of material are produced proximate to the joint.

This effect is negligible on frames having certain dimensions (by way of indication, a width in excess of 20 mm), but become evident on small frames made of softwood.

A second type of metallic staple has a V-shaped central part which opens slightly in the direction of insertion, two small lateral flaps and a cutting edge with a two-sided taper.

This type of staple, differently from the preceding one, penetrates in the wood longitudinally with respect to the fibers, but generates a traction between the two strips and at the joint, carrying material toward the inner part of the corner and leaving a small crack or split on the outer part.

This unwanted effect is irrelevant for softwood, in which the slight splitting of the wood fibers is negligible.

A third type of metallic staple has a V-shaped central part, two small lateral wings and a cutting edge which has a single-sided taper.

Said staple penetrates the wood longitudinally with respect to the fibers, producing, by virtue of the presence of the single-sided taper, the effect of moving the material toward the inside of the corner, generating the required traction.

The finish of the joint thus obtained is good, although it is less solid than that obtained with the previously described metallic staples.

The degree of sharpness affects the effectiveness of the joint.

SUMMARY OF THE INVENTION

The aim of the present invention is to provide a metallic staple which combines the positive characteristics of the above mentioned main types without having the disadvantages which affect them.

A consequent primary object is to provide a metallic staple which deforms and swells as little as possible the elements along the joining line.

Another important object is to provide a metallic staple the cutting edge whereof does not suffer damage in hardwood and allows the insertion, one after the other, of a plurality of staples for joining particularly thick frames.

Another object is to provide a staple which forces the wood elements against one another in a region spaced from the coupling point.

Not least object is to provide a metallic staple which can be manufactured at low cost with conventional production facilities.

This aim, these objects and others which will become apparent hereinafter are achieved by a metallic staple particularly for the butt joining of elements made of wood or the like, of the type which comprises a rectangular lamina with longitudinal shapings and a transverse cutting edge, characterized in that said shapings comprise a central V-shaped portion which is laterally blended to two wings which define respective portions of inclined planes which diverge with respect to one another in the direction of insertion, said cutting edge having a two-sided taper.

BRIEF DESCRIPTION OF THE DRAWINGS

Further characteristics and advantages of the invention will become apparent from the detailed description of an embodiment thereof, illustrated only by way of non-limitative example in the accompanying drawings, wherein:

FIG. 1 is a perspective view of the staple according to the invention;

FIG. 2 is a plan view of the staple of FIG. 1;

FIG. 3 is a rear elevation view of the staple of FIG. 1, taken from the side opposite to the insertion side;

FIG. 4 is a front elevation view of the staple of FIG. 1, taken from the insertion side;

FIG. 5 is an enlarged detail view of the cutting edge of the staple of FIG. 1;

FIG. 6 is a view of two staples, such as those of FIG. 1, inserted so as to join two wood strips which are suitable for composing a frame.

DESCRIPTION OF THE PREFERRED EMBODIMENTS

With reference to the above figures, the metallic staple according to the invention comprises, as seen in plan view, a substantially rectangular lamina, generally indicated by the reference numeral 1.

Said lamina 1 has longitudinal shapings, a first edge 20 and a cutting edge 2 with a two-sided taper on the transverse insertion side.

According to the invention, the longitudinal shapings of the lamina 1 comprise two interconnected central portions 3a, 3b defining a central V-shaped portion 3 which has such an angle that its two parts are arrangeable substantially parallel to the fibers of respective elements 4 and 5, made of wood or the like, to be joined. For example, as clearly illustrated in FIG. 6, the elements 4, 5 to be connected together each have an end cut at 45 degrees such that, when the cut ends are butt-jointed, the elements 4, 5 together form an angle of 90 degrees. As shown in FIGS. 3, 4 and 6, the central V-shaped portion 3 defines an angle of approximately 90 degrees, whereby the central portions 3a, 3b extend substantially parallel to the fibers of the wood constituting the elements 4, 5.

Conveniently, the vertex 30 of said portion 3 extends substantially perpendicularly from said first edge 20 to said cutting edge 2 (see FIG. 1), and has a very marked blending curvature so as to not cause negative effects along the joining line 6 between the elements 4 and 5.

At its sides, said central portion 3 is radiused to respective arcuately-shaped wings 7 and 8 which have a substantially S-shaped profile.

The regions which blend said wings 7 and 8 with the portion 3 constitute two concavities 7a, 8a which are opposite to the concavity 31 of the vertex 30 of said portion 3.

At this point it should be stressed that the central regions of the wings 7 and 8 define respective inclined plane portions 9 and 10 which diverge away from each other in a direction extending from the first edge 20 to the cutting edge 2. As shown in FIG. 2, the wings 7, 8 are substantially symmetrical with respect to the vertex 30 of the central V-shaped portion 3 and are located remote from the vertex 30.

The two wings 7 and 8 end with respective co-planar flat lateral portions 11 and 12. As shown in FIGS. 1 and 2, the flat portions 11, 12 have a tapered configuration defining a maximum width at the upper edge 20 and a minimum width at the cutting edge 2.

At this point it should be stressed, as already mentioned above, that the central portion 3 is suitable for penetrating the wood longitudinally with respect to its fibers, deforming and swelling as little as possible the frame along the joining line.

The presence of the two-sided taper defined by the inclined plane portions 9, 10 causes the staple to penetrate the wood easily without undergoing damage in hardwood and allowing the insertion, one after the other, of a plurality of staples for joining particularly thick frames.

The two portions 9 and 10 of the divergent wings 7 and 8 penetrate the wood in a transverse direction with respect to the fibers and force the two wood elements longitudinally against one another in a region which is spaced from the joining point, with the result that the swelling thus produced is absorbed by the material and is thus less evident.

In practice it has thus been observed that the staple according to the invention has achieved the intended aim and objects.

In practice, the materials employed, so long as they are compatible with the contingent use, as well as the dimensions, may be any according to the requirements.

I claim:

1. Metallic staple particularly for butt jointing elements made of wood comprising;
a substantially rectangular lamina (1) having a first edge (20), a cutting edge (2) and longitudinal shapings (3a, 3b, 7-12),
wherein said longitudinal shapings comprise;
two interconnected central portions (3a, 3b) defined by said lamina (1);
a central V-shaped portion (3) defined by said interconnected central portions (3a, 3b);
two arcuately-shaped wings (7, 8) radiused to said interconnected central portions (3a, 3b);
inclined plane portions (9, 10) defined by said wings (7, 8), and;
flat lateral portions (11, 12) connected to said inclined plane portions (9, 10);
wherein said inclined plane portions (9, 10) diverge away from each other in a direction extending from said first edge (20) to said cutting edge (2), and
wherein said flat lateral portions (11, 12) are coplanar.

2. Metallic staple according to claim 1, further comprising;
a central concavity (31) defined by said central V-shaped portion (3), and;
two concavities (7a, 8a) defined between said central portions (3a, 3b) and said wings (7, 8), said two concavities (7a, 8a) being located on an opposite face of said substantially rectangular lamina (1) with respect to said central concavity (31).

3. Metallic staple according to claim 1, further comprising a vertex (30) defined by said central V-shaped portion (3) and extending substantially perpendicularly from said first edge (20) to said cutting edge (2).

4. Metallic staple according to claim 1, wherein said wings (7, 8) have a substantially S-shaped profile.

5. Metallic staple according to claim 1, wherein said inclined plane portions (9, 10) which diverge away from each other are substantially symmetrical with respect to said vertex (30).

6. Metallic staple according to claim 1, wherein said inclined plane portions (9, 10) which diverge away from each other are located remote from said vertex (30).

7. Metallic staple according to claim 1, wherein said flat lateral portions (11, 12) have a tapered configuration defining a maximum width and a minimum width, said maximum width being defined at said first edge (20), said minimum width being defined at said cutting edge (2).

8. Metallic staple particularly for butt jointing elements made of wood comprising;
a substantially rectangular lamina (1) having a first edge (20), a cutting edge (2) and longitudinal shapings (3a, 3b, 7-12),
wherein said longitudinal shapings comprise;
two interconnected central portions (3a, 3b) defined by said lamina (1);
a central V-shaped portion (3) defined by said interconnected central portions (3a, 3b);
two arcuately-shaped wings (7, 8) radiused to said interconnected central portions (3a, 3b);
inclined plane portions (9, 10) defined by said wings (7, 8), and;
flat lateral portions (11, 12) connected to said inclined plane portions (9, 10);
wherein said inclined plane portions (9, 10) diverge away from each other in a direction extending from said first edge (20) to said cutting edge (2),
wherein said wings (7, 8) have a substantially S-shaped profile, and
wherein said flat lateral portions (11, 12) are coplanar and have a tapered configuration defining a maximum width and a minimum width, said maximum width being defined at said first edge (20), said minimum width being defined at said cutting edge (2).

9. Metallic staple according to claim 8, further comprising;
a central concavity (31) defined by said central V-shaped portion (3), and;
two concavities (7a, 8a) defined between said central portions (3a, 3b) and said wings (7, 8), said two concavities (7a, 8a) being located on an opposite face of said substantially rectangular lamina (1) with respect to said central concavity (31);

10. Metallic staple according to claim 8, further comprising a vortex (30) defined by said central V-shaped portion (3) and extending substantially perpendicularly from said first edge (20) to said cutting edge (2).

11. Metallic staple according to claim 8, wherein said inclined plane portions (9, 10) which diverge away from each other are substantially symmetrical with respect to said vertex (30).

12. Metallic staple according to claim 8, wherein said inclined plane portions (9, 10) which diverge away from each other are located remote from said vertex (30).

13. Metallic staple particularly for butt jointing elements made of wood comprising;
a substantially rectangular lamina (1) having a first edge (20) and a cutting edge (2), and defining longitudinal shapings (3a, 3b, 7-12), said longitudinal shapings comprising;
two arcuately-shaped wings (7, 8) having a substantially S-shaped profile defined by said lamina (1);
two interconnected central portions (3a, 3b) defined by said lamina (1) between said two wings (7, 8), said wings (7, 8) being radiused to said central portions (3a, 3b);
a central V-shaped portion (3) defined by said interconnected central portions (3a, 3b);
a central concavity (31) defined by said central V-shaped portion (3);
a vertex (30) defined by said central V-shaped portion (3) and extending substantially perpendicularly from said first edge (20) to said cutting edge (2);
two concavities (7a, 8a) defined between said central portions (3a, 3b) and said wings (7, 8), said two concavities (7a, 8a) being located on an opposite face of said substantially rectangular lamina (1) with respect to said central concavity (31);
inclined plane portions (9, 10) defined by said wings (7, 8) remote from said vertex (30) and being substantially symmetrical with respect to said vertex (30), and;
flat lateral portions (11, 12) connected to said inclined plane portions (9, 10) and having a tapered configuration defining a maximum width and a minimum width, said maximum width being defined at said first edge (20), said minimum width being defined at said cutting edge (2);
wherein said inclined plane portions (9, 10) diverge away from each other in a direction extending from said first edge (20) to said cutting edge (2), and
wherein said flat lateral portions (11, 12) are coplanar.

* * * * *